United States Patent
Tran et al.

(10) Patent No.: US 7,209,483 B2
(45) Date of Patent: Apr. 24, 2007

(54) APPARATUS, AND ASSOCIATED METHOD, FOR OPERATING UPON PACKET DATA COMMUNICATED IN A PACKET COMMUNICATION SYSTEM UTILIZING A PACKET RETRANSMISSION SCHEME

(75) Inventors: Jean-Marie Tran, San Diego, CA (US); Thomas Kenney, San Diego, CA (US)

(73) Assignee: Nokia Corporation, Espoo (FI)

( * ) Notice: Subject to any disclaimer, the term of this patent is extended or adjusted under 35 U.S.C. 154(b) by 864 days.

(21) Appl. No.: 10/078,139

(22) Filed: Feb. 19, 2002

(65) Prior Publication Data

US 2003/0156573 A1    Aug. 21, 2003

(51) Int. Cl.
  H04L 12/56 (2006.01)
  H04Q 7/00 (2006.01)
  G06Q 11/00 (2006.01)
(52) U.S. Cl. .................. 370/394; 370/332; 714/746
(58) Field of Classification Search ............. 370/394, 370/474, 338, 349, 332, 333; 714/746, 748, 714/749

See application file for complete search history.

(56) References Cited

U.S. PATENT DOCUMENTS

| | | | |
|---|---|---|---|
| 6,697,986 B2* | 2/2004 | Kim et al. ............... | 714/751 |
| 6,798,846 B2* | 9/2004 | Golitschek Edler Von Elbwart et al. ... | 375/298 |
| 2002/0015419 A1* | 2/2002 | Kim et al. .............. | 370/468 |
| 2002/0027956 A1* | 3/2002 | Lee et al. ............... | 375/262 |
| 2002/0196812 A1* | 12/2002 | Yamaguchi et al. ...... | 370/474 |
| 2003/0076783 A1* | 4/2003 | Das et al. .............. | 370/236 |
| 2003/0110435 A1* | 6/2003 | Wu et al. ............... | 714/748 |
| 2003/0118031 A1* | 6/2003 | Classon et al. ...... | 370/395.54 |
| 2003/0126551 A1* | 7/2003 | Mantha et al. .......... | 714/790 |
| 2003/0133497 A1* | 7/2003 | Kinjo et al. ............ | 375/152 |

\* cited by examiner

*Primary Examiner*—Wing Chan
*Assistant Examiner*—Venkatesh Haliyur
(74) *Attorney, Agent, or Firm*—Alston & Bird LLP

(57) ABSTRACT

Apparatus, and an associated method, for a packet radio communication system that utilizes a packet retransmission scheme. A data packet, together with a selected number of retransmissions thereof are sent to a mobile station, or other receiving station. A channel condition estimator estimates channel conditions on the communication channel and, responsive to the channel condition estimates, selection is made of the number of packet data retransmissions that are to be effectuated prior to performing decoding operations to recover the informational content of the data packet.

20 Claims, 3 Drawing Sheets

APPARATUS, AND ASSOCIATED METHOD, FOR OPERATING UPON PACKET DATA COMMUNICATED IN A PACKET COMMUNICATION SYSTEM UTILIZING A PACKET RETRANSMISSION SCHEME

The present invention relates generally to a manner by which to communicate packet data in a packet radio, or other, communication system that uses a packet retransmission scheme. More particularly, the present invention relates to apparatus, and an associated method, in which selectably to combine a data packet together with a selected number of retransmissions thereof, sent pursuant to the retransmission scheme, and thereafter decoding the data. Selection of how many times to retransmit the data packet and when to perform the decoding operations is made responsive to channel conditions of the channel upon which the data packet, and the retransmissions thereof, are communicated. Improved decoder performance is provided as channel conditions are used to select the amount of data redundancy to be introduced prior to performing the decoding operations.

BACKGROUND OF THE INVENTION

A communication system operates to communicate data between a sending station and a receiving station. The data is communicated upon a communication channel formed between the sending and receiving stations. If necessary, the data to be communicated by the sending station is first converted into a form to permit communication of the data upon the communication channel. The data communicated upon the communication channel is detected at the receiving station. And, subsequent to detection of the data at the receiving station, operations are performed upon the data to recover the informational content thereof.

Many different types of communication systems have been developed and implemented. In some communication systems, the data to be communicated by the sending station to the receiving station is communicated in the electrical form by way of wireline connections interconnecting the sending and receiving stations. And, in some communication systems, the data is communicated in electromagnetic form, by way of radio links formed between sending and receiving stations. And, some communication systems include communication paths between endpoints formed of the sending and receiving stations that include both wireline and radio link portions such that the data is communicated in electrical form along a portion of the communication path and in electromagnetic form along another portion of the communication path.

The communication system is referred to as being a radio communication system when radio links are used to communicate the data in electromagnetic form. In contrast to a conventional wireline communication system that requires electrical connections to be formed between the sending and receiving stations, a radio communication system is inherently mobile. That is to say, because radio links, rather than wireline connections, are used along at least a portion of the communication paths extending between the sending and receiving stations, the sending and receiving stations need not be positioned in fixed locations, connected to wirelines, to permit communications to be effectuated therebetween.

A cellular communication system is a type of radio communication system that has achieved wide levels of usage and has been installed throughout extensive portions of the world. Successive generations of cellular communication systems have been developed. Reference is commonly made to at least three generations of cellular communication systems. A so-called, first-generation, cellular communication system generally refers to a cellular communication system that utilizes an analog modulation technique. An AMPS (advanced mobile phone service) cellular communication system is exemplary of a first-generation, cellular communication system. A so-called, second-generation, cellular communication system typically refers to a cellular communication system that utilizes a digital, multiple-access communication scheme. A GSM (global system for mobile communications) cellular communication system and an IS-95 (interim standard—1995), CDMA (code-division, multiple-access) cellular communication system are each exemplary of a second generation cellular communication system.

Third-generation, cellular communication systems are presently under development. Third-generation, cellular communication systems refer generally to cellular communication systems intended to provide universal communication service, including effectuation of data services, voice services, and multi-media services. Proposals for third-generation, cellular communication systems generally provide for IP (Internet Protocol)-formatted data. And, subsequent-generation, cellular communication systems are also being proposed. Such subsequent-generation cellular communication systems are generally also packet-based communication systems.

In a packet-based, communication system, data that is to be communicated by a sending station to a receiving station is formatted into data packets. And, the data packets are communicated upon the communication channel, usually during discrete bursts, and delivered to a receiving station. The data packets are operated upon by the receiving station to recover the informational content thereof. The communication channel upon which the packet data is communicated typically exhibits fading characteristics such that values of the data contained in a packet, when delivered to the receiving station differs in some values with the corresponding values of the data when transmitted by the sending station.

Operations performed upon the data packets at the receiving station attempt to compensate for the distortion introduced upon the data during its transmission upon the communication channel. If the distortion cannot adequately be compensated for, the informational content thereof cannot be recovered.

Some packet communication systems utilize a packet retransmission scheme in which a data packet is retransmitted by the sending station if the data packet has not been affirmed to have been adequately communicated to the receiving station. ARQ and HARQ retransmission schemes are used in a feedback setup in which the receiving station generates an acknowledgment when the informational content of the data packet is recovered at the receiving station. If the informational content is not acceptably recovered, the acknowledgment is not returned to the sending station. And, in an HARQ system, a negative acknowledgment is also returned to the sending station when the informational content of a data packet cannot acceptably be recovered. Retransmission of the data packet is thereafter effectuated. Multiple retransmissions of the data packet, if necessary, can also be effectuated. By sending multiple transmissions of the data packet, the likelihood that the informational content thereof can be recovered is increased.

1×EV-DO and 1×Ev-DV, cellular system standard specification proposals, related to the proposed cdma2000 system, provide for analogous such retransmission schemes. In such present proposals, packet data is communicated to a mobile station, and a mobile station selectably requests packet retransmission as well as indicating to a base station of such system of channel conditions on a forward link upon which the packet data is communicated. If an initial transmission of a data packet, when received at the mobile station, is in error, the mobile station returns an NAK (negative acknowledgment) to the base station. Additional retransmissions of the data packet occur until the data packet is received correctly or until a maximum number of retransmissions occur. The retransmissions sometimes involve incremental redundancy where subsequent packets contain new parity information, as well as repeat redundancy where the same information is retransmitted.

Such existing retransmission schemes, however, generally perform data combining operations and decoding operations at each successive retransmission of a data packet. This existing operation is computationally-intensive and power-consumptive.

An improved manner by which to communicate packet data pursuant to a retransmission scheme that is less computationally-intensive and power-consumptive would be advantageous.

It is in light of this background information related to packet communication systems that the significant improvements of the present invention have evolved.

SUMMARY OF THE INVENTION

The present invention, accordingly, advantageously provides apparatus, and an associated method, by which to facilitate communication of packet data in a packet radio, or other, communication system.

Through operation of an embodiment of the present invention, a manner is provided by which to combine a data packet together with a selected number of retransmissions thereof. Thereafter, the data is decoded.

Selection of the number of retransmissions of the data packet prior to performance of decoding operations thereon is made responsive to channel conditions of the channel upon which the data packet and the retransmissions thereof are communicated. When the communication channel conditions are poor, greater numbers of retransmissions of the data packet are performed and combined theretogether prior to performance of decoding operations thereon. And, when channel conditions are determined to be good, fewer numbers of retransmissions are sent prior to performance of decoding operations upon the combination of the originally-transmitted data packets together with the retransmissions thereof.

Instead of performing decoding operations subsequent to each retransmission of the data packet, a selected number of data packet retransmissions are caused to be sent to the receiving station, and, once received, decoding operations are then performed. Reduced power consumption required to perform the decoding operations results as decoding operations need not be performed subsequent to every retransmission of the data packet.

Operation of an embodiment of the present invention takes advantage of a general relationship between a packet error rate of values of a data packet, subsequent to performance of decoding operations thereon, and the number of retransmissions of the data packet. The packet error rate generally decreases as a function of increased numbers of retransmissions of the data packet. By combining an increased number of values of the data packet as a result of increased numbers of retransmissions thereof, the likelihood of a packet error is reduced. By selecting a number, N, of retransmissions prior to performing decoding operations, reduced numbers of decoding operations are performed while also providing a significant likelihood of adequate recovery of the informational content of a data packet.

In one implementation, the number, N, of retransmissions of a data packet is a fixed value, calculated in advance, either theoretically or based upon operational simulations. The data packet together with the selected number of retransmissions thereof are provided to a combiner that buffers, or otherwise combines, the values provided thereto. Operation of a decoder is inhibited until all N retransmissions of the data packet are received at the receiving station. Once the selected number of retransmissions are received, the decoder operates to decode the values received at the receiving station.

In another implementation, the number, N, of retransmissions is dynamically, or otherwise adaptively, determined. The number of retransmissions is determined, e.g., by measuring a channel quality indication and accumulating values thereof at successive retransmissions of the data packet. When the cumulative sum of the accumulated values equals, or exceeds, a threshold, the values are combined and provided to a decoder to decode the values provided thereto. In another implementation, the dynamic selection of the number N of retransmissions is made based upon instantaneous measurements, such as measurements made together with, or subsequent to, retransmission of the data packet. If the instantaneous measurement equals, or exceeds, a threshold value, the values of the data packet together with the selected number of retransmissions thereof already-transmitted to the receiving station or provided to a decoder to be decoded thereat.

In one implementation, a mobile station is operable in a packet radio communication system, such as a cellular communication system constructed to communicate 1×EV-DO communication system, to which packet data is communicated by a base station. The mobile station includes a channel quality estimator that generates forward-link channel communication conditions of the forward-link channel upon which the packet data is communicated to the mobile station. Channel quality estimates are provided to a controller. The controller controls operation of a packet buffer and combiner and a turbo decoder. The controller also controls generation of acknowledgment and negative acknowledgment (ACK/NAK) responses that are returned by the mobile station to the base station subsequent to detection at the mobile station of a data packet. Responsive to indications of the channel quality estimated by the estimator, the controller selectably causes negative acknowledgment messages to be returned to the base station, thereby precipitating retransmission of the data packet. The data packet, together with retransmissions thereof, are buffered and combined at the packet combiner. When the channel quality estimate generated by the estimator is of values, either instantaneously or cumulatively, at least as great as a selected threshold, the controller initiates generation of a positive acknowledgment (ACK) message to be returned to the base station. The controller also releases the values buffered and combined at the packet combiner and causes decoding operations to be performed by the decoder when the values of the data are provided thereto.

Because the decoder does not need to operate at each successive retransmission of the data packet, reduced computational complexity, as well as reduced levels of power consumption, are provided pursuant to operation of an embodiment of the present invention.

In these and other aspects, therefore, apparatus, and an associated method, are provided for a packet communication system. Packet data is communicated to a first communication station pursuant to an ARQ retransmission scheme upon a communication channel by a second communication station. Recovery of the values of a data packet communicated to the first communication station is facilitated. A data packet combiner is coupled to receive at least a selected data packet of the packet data together with a selected number of retransmissions of the selected data packet. The data packet combiner at least buffers the selected data packet and the selected number of retransmissions thereof. A decoder is coupled to the data packet combiner. The decoder is selectably operable to recover values of the selected data packet and the selected number of retransmissions thereof. The decoder selectably decodes the values provided thereto to form a decoded representation of the selected data packet. A controller is coupled to receive indications of channel conditions of the communication channel. The controller operates responsive to the indications of the channel conditions and selects the selected number of retransmissions buffered at the packet data combiner, together to be provided to the decoder.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
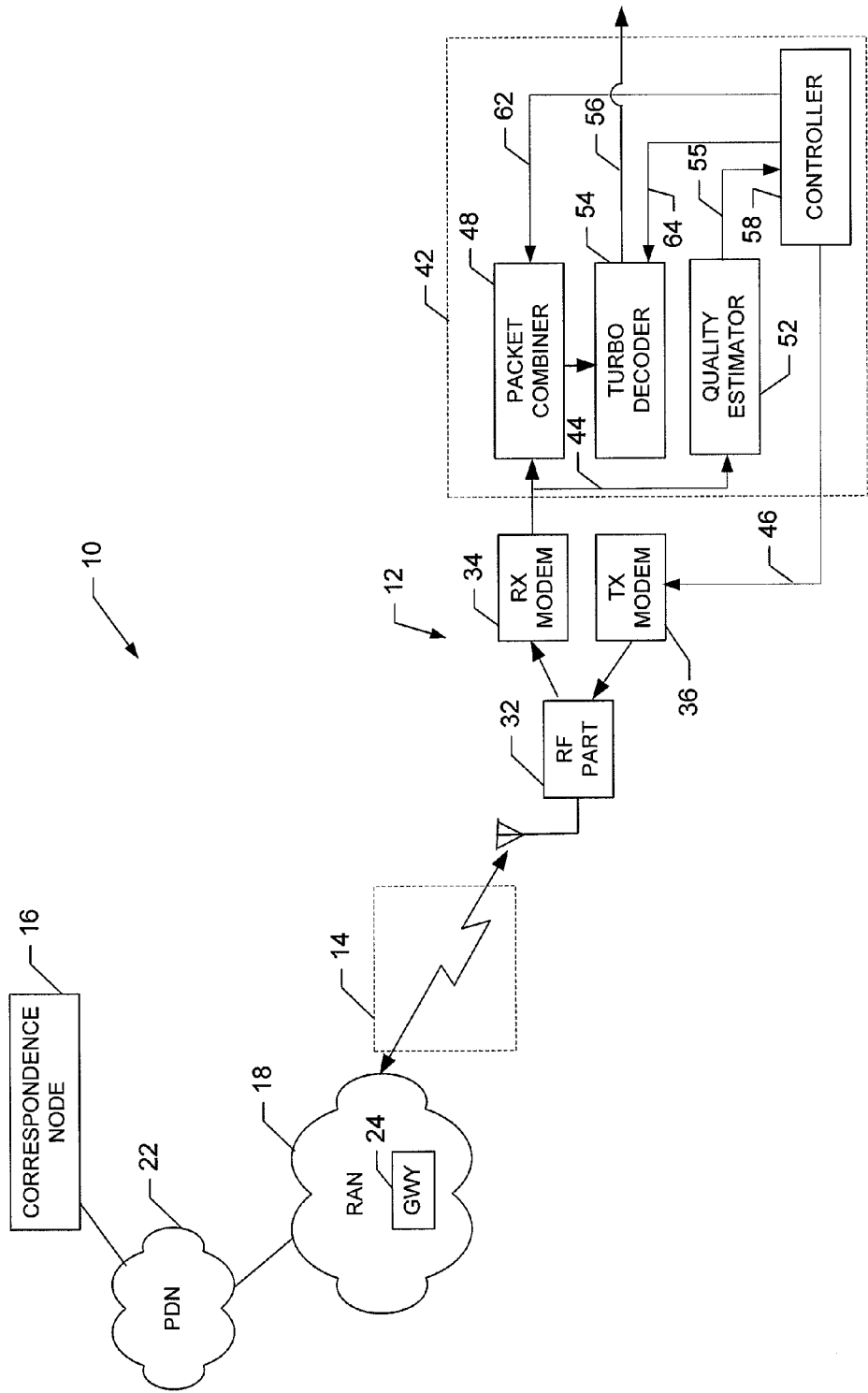
FIG. 1 illustrates a functional block diagram of a packet radio communication system in which an embodiment of the present invention is operable.

Referring first to FIG. 1, a communication system, shown generally at 10, provides for the communication of packet data between communication stations. Here, the communication system forms a packet radio communication system, such as a third-generation, cellular communication system that operates to provide 1xEV-DO or 1xEv-DV data services. While the following description shall describe operation of an embodiment of the present invention in which the packet communication system comprises a packet-based, cellular communication system, it should be understood that an embodiment of the present invention is analogously also operable in other types of packet-based communication systems.

Packet-formatted data is communicated between communication stations of the communication system during a communication session to effectuate a communication service. Here, the communication system is shown to include a mobile station 12 that operates to communicate packet-formatted data by way of a radio link 14 with a network part of the communication system to which a correspondent node 16 is connected. Data that is originated at the correspondent node, for instance, is communicated to the mobile station by way of a communication path formed through the network part of the communication system, and upon the radio link 14. The correspondent node and the mobile stations form the endpoints of a communication session pursuant to which a communication service is effectuated.

The network part of the communication system includes a radio access network (RAN) 18 and a packet data network (PDN) 22, such as the Internet backbone. The packet data network and the radio access network are connected together by way of a gateway (GWY) 24. The radio access network, in the exemplary implementation, is formed of the network infrastructure of a CDMA 2000, cellular communication system that provides for 1xEV-DO and 1xEv-DV data services in which packet-formatted data is communicated upon a forward link of the radio link 14 to the mobile station.

The mobile station forms a radio transceiver capable of both receiving data communicated thereto upon the forward link of the radio link as well as sending data upon a reverse link of the radio link. And, pursuant to a packet retransmission scheme, the mobile station operates to generate ACK and NAK messages upon the reverse link of the radio link to acknowledge successful delivery of a data packet or, alternately, to instruct the network part of the communication system to retransmit a data packet.

The mobile station is here shown to include a radio frequency (RF) part 32 that operates at radio frequencies upon data received at the mobile station and data to be transmitted to the mobile station. The RF part is coupled to a receive modem 34 and to a transmit modem 36. The receive modem operates upon data received at the mobile station and down-converted in frequency during operation of the RF part. And, the transmit modem generates transmit data that is provided to the RF part 32. The mobile station includes apparatus 42 of an embodiment of the present invention. The apparatus is coupled to the receive modem 34 by way of the line 44 and to the transmit modem by way of the line 46.

The apparatus 42 includes a packet combiner 48 and a forward link channel quality estimator 52. The packet combiner and the estimator are each coupled to the line 44. When a data packet communicated upon the forward link to the mobile station is detected thereat and operated upon by the RF part and the receive modem, the data packet is provided to the packet combiner to be buffered thereat and selectably combined with other data packets buffered thereat. Namely, during operation of an embodiment of the present invention, a data packet together with a selected number of retransmissions thereof, are buffered and selectably combined at the packet combiner.

The forward link channel quality estimator 52 operates to estimate communication conditions upon the forward link channel upon which the packet data is communicated. The estimate is obtained responsive to indicia contained in, or derived from, the data packets received at the mobile station.

The apparatus further includes a turbo decoder 54 that is coupled to the packet combiner 48. The decoder is selectably operable to decode the data buffered, and combined, at the packet combiner. Decoded output data is generated on the line 56 upon completion of decoding operations by the decoder.

The apparatus further includes a controller 58. The controller is coupled to receive channel quality estimates formed by the estimator 52. The controller selectably generates control signals for application, here represented by way of the lines 62 and 64, to the packet combiner 48 and to the turbo decoder 54, respectively. The controller further selectably generates the ACK and NAK messages to be returned on a reverse link channel to the network part of the communication system. Responsive to instantaneous, or cumulative, values of the estimate formed by the estimator, the controller causes generation of the ACK or NAK messages as well as causes operation of the packet combiner to release the data buffered and combined thereat to the decoder and also to cause decoding operations to be performed by the decoder.

Figure 2:
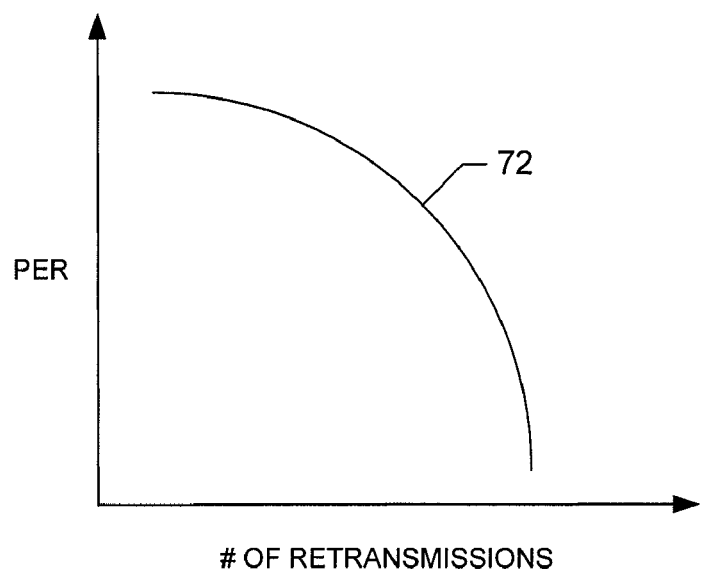
FIG. 2 illustrates a graphical representation of an exemplary relationship between the number of retransmissions of a data packet in a packet radio communication system that utilizes a packet retransmission scheme and the corresponding packet error rate of a decoded packet, decoded from a combination of the values of the data packet together with the retransmissions thereof.

FIG. 2 illustrates a graphical representation of a plot 72 of a packet error rate formed as a function of a number of retransmissions of a data packet pursuant to the data retransmission scheme by which the communication system in FIG. 1 is operable. The plot indicates that with increasing numbers of retransmissions, the packet error rate of decoded data decreases. The plot indicates that, probabilistically, a data packet can be correctly decoded on its first transmission to the mobile station. Here, N retransmissions corresponds to a point on the plot at which an acceptable chance of correctly decoding the packet occurs. The value of N is calculated in advance, theoretically, or by way of simulations of operation.

Operation of the controller takes into account the relationship defined by the plot 72 in the generation of the ACK and NAK messages as well as the control signals applied to the packet combiner and turbo controller.

Figure 3:
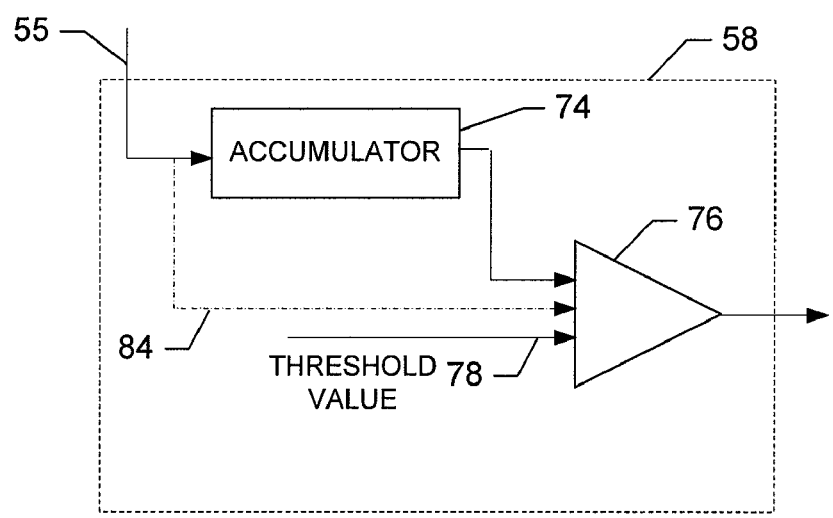
FIG. 3 illustrates a functional representation of operation of a portion of an embodiment of the present invention.

FIG. 3 illustrates a functional representation of operation of the controller 58 that forms a portion of the apparatus 42. Here, the controller causes generation of the signals on the lines 62, 64, and 46 responsive to accumulated values of the channel quality estimate formed by the estimator 52 (shown in FIG. 1). At each successive retransmission of the data packet, an indicia of the channel condition estimated by the estimator is provided by way of line 55 to a cumulator 74 that forms a functional portion of the controller. The cumulator accumulates values of the indicia of the estimates to form a cumulative total. Indications of the cumulative total are provided to a comparator 76 that compares the cumulative total with a threshold value, here indicated to be applied to the comparator by way of the line 78. When the comparator indicates that the cumulative total is at least as great as the threshold value, an indication is generated on the line 82. Responsive to such indication, NAK messages are no longer generated by the mobile station. Also, the data buffered and combined at the packet combiner is released to the turbo decoder and a decoded representation of the data packet is generated on the line 56 at which point, if the packet is decoded successfully, an ACK message is transmitted. Otherwise, an NAK is transmitted.

In another implementation, instantaneous values, rather than cumulative values, are provided to the comparator to be compared against a threshold value. The application of instantaneous values is represented by the line 84, shown in dash, in the figure.

Because the decoder need not be operated subsequent to each retransmission of a data packet, improved power-performance of the mobile station is permitted.

Figure 4:
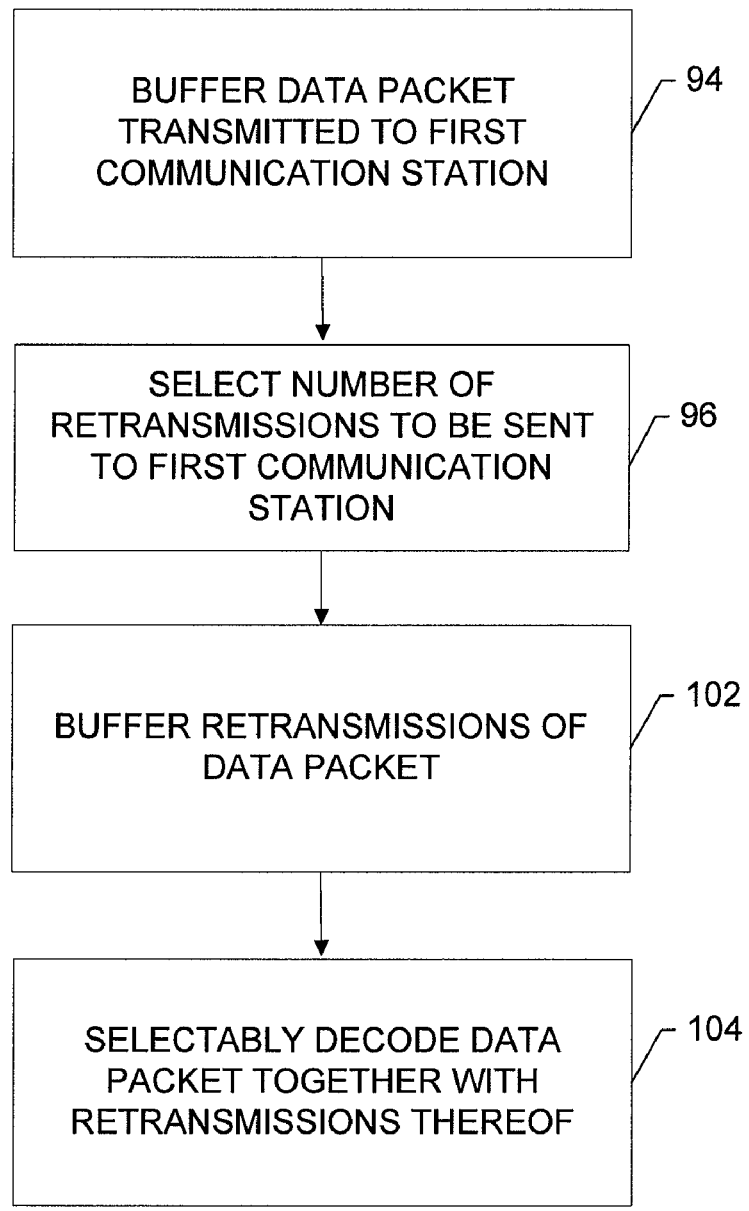
FIG. 4 illustrates a method flow diagram that lists the method steps of the method of operation of the method of an embodiment of the present invention.

FIG. 4 illustrates a method, shown generally at 92, of the method of operation of an embodiment of the present invention. The method facilitates recovery at a first communication station of values of a data packet communicated thereto by a second communication station.

First, and as indicated by the block 94, a selected data packet of the packet data transmitted to the first communication station is buffered. Then, and as indicated by the block 96, a selected number of retransmissions of the selected data packet is selected to be transmitted to the first communication station. The selected number is selected responsive to indications of channel conditions of the communication channel.

Then, and as indicated by the block 102, retransmissions of the selected data packet are further buffered. And, as indicated by the block 104, the selected data packet is selectably decoded together with the selected number of retransmissions thereof.

When the number of retransmissions of the data packet is dynamically selected, changing communication conditions on the communication channel upon which the data packet is communicated can correspondingly be quickly changed to increase, or decrease, the number of packet data retransmissions to increase throughput, or increase redundancy as appropriate, to best effectuate communication of the packet data.

The previous descriptions are of preferred examples for implementing the invention, and the scope of the invention should not necessarily be limited by this description. The scope of the present invention is defined by the following claims:

The invention claimed is:

1. In a packet communication system in which packet data is communicated to a first communication station pursuant to an ARQ retransmission scheme upon a communication channel by a second communication station, an improvement of apparatus for the first communication station for facilitating recovery of values of a data packet communicated to the first communication station, said apparatus comprising:

a data packet combiner block coupled to receive at least a selected data packet of the packet data together with at least a selected number of retransmissions of the selected data packet, said data packet combiner at least for buffering the selected data packet and the selected number of retransmissions thereof;

a decoder coupled to said data packet combiner, said decoder selectably for recovering values of the selected data packet and the selected number of retransmissions thereof, said decoder for selectably decoding the values provided thereto to form a decoded representation of the selected data packet; and a controller coupled to receive indications of channel conditions of the communication channel, said controller operable responsive to the indications of the channel conditions for selecting the selected number of retransmissions buffered at said packet data combiner, together to be provided to said decoder prior to decoding.

2. The apparatus of claim 1 wherein said controller further indicates generation of NAK (negative acknowledgment) messages for return to the second communication station until the selected number of retransmissions of the selected data packet are buffered at said data packet combiner.

3. The apparatus of claim 1 wherein said controller further initiates generation of ACK (acknowledgment) messages for return to the second communication station when the selected number of retransmissions of the selected data packet are buffered at said packet data combiner.

4. The apparatus of claim 1 wherein the selected number of retransmissions of the selected data packet selected by said controller to be at least buffered at said data packet combiner comprises a fixed number.

5. The apparatus of claim 1 wherein the selected number of retransmissions of the selected data packet selected by said controller to be at least buffered at said data packet combiner comprises an adaptively-determined number.

6. The apparatus of claim 5 wherein the adaptively-determined number selected by said controller is selected responsive to values of the indications of the channel conditions.

7. The apparatus of claim 6 wherein the adaptively-determined number selected by said controller is selected responsive to a cumulative value of the indications of the channel conditions.

8. The apparatus of claim 7 wherein the cumulative value of the indications of the channel conditions responsive to which said controller selects the adaptively-determined number comprises a summation of successive values determined at successive deliveries to the first communication station of retransmissions of the selected data packet.

9. The apparatus of claim 8 wherein said controller selects the selected number of retransmissions buffered at said packet data combiner by comparing the cumulative value subsequent to each retransmission of the selected data packet with a threshold value.

10. The apparatus of claim 9 wherein said controller further initiates decoding by said decoder of the selected data packet together with the selected number of retransmissions thereof when the cumulative value is at least as great as the threshold value.

11. The apparatus of claim 6 wherein said controller selects the selected number of retransmissions buffered at said packet data responsive to a noncumulative value of the indications of the channel conditions.

12. The apparatus of claim 11 wherein said controller further initiates decoding by said decoder of the selected data packet together with the selected number of retransmissions thereof when the cumulative value is at least as great as a selected threshold value.

13. The apparatus of claim 1 wherein said controller selectably further initiates generation of an ACK (acknowledgment) message upon successful decoding operations performed by said decoder.

14. The apparatus of claim 11 wherein selection by said controller to initiate the generation of the ACK message is made responsive to a redundancy code check made with part of the decoded representation formed by said decoder.

15. The apparatus of claim 1 wherein the packet communication system comprises a packet radio communication system, wherein the first communication station comprises a mobile station, and wherein said packet data combiner, said decoder, and said controller comprise portions of the mobile station.

16. In a method for communicating in a packet communication system in which packet data is communicated to a first communication station pursuant to an ARQ retransmission scheme upon a communication channel by a second communication station, an improvement of a method for the first communication station for facilitating recovery of values of a data packet communicated to the first communication station, said method comprising:

buffering a selected data packet of the packet data transmitted to the first communication station;

selecting a selected number of retransmissions of the selected data packet to be transmitted to the first communication station responsive to indications of channel conditions of the communication channel prior to decoding;

further buffering the retransmissions of the selected data packet;

selectably decoding the selected data packet together with the selected number of retransmissions thereof.

17. The method of claim 16 wherein the selected number of retransmissions selected during said operation of selecting the selected number of retransmissions is an adaptively determined value.

18. The method of claim 17 wherein the adaptively-determined value is selected responsive to a cumulative value of the indications of the channel conditions.

19. The method of claim 18 wherein the selected number of retransmissions selected during said operation of selecting comprises a single retransmission set and wherein said operations of selecting and further buffering are iteratively performed.

20. The method of claim 19 wherein said operation of decoding is performed subsequent to selection during said operation of selecting not to retransmit an additional retransmission of the selected data packet.

* * * * *